United States Patent [19]

Yamamuro

[11] Patent Number: 4,942,563
[45] Date of Patent: Jul. 17, 1990

[54] SIGNAL PROCESSING APPARATUS AND METHOD CAPABLE OF PROVIDING PRECISE DIGITAL DATA

[75] Inventor: Mikio Yamamuro, Kawasaki, Japan
[73] Assignee: Kabushiki Kaisha Toshiba, Kawasaki, Japan
[21] Appl. No.: 249,928
[22] Filed: Sep. 27, 1988
[30] Foreign Application Priority Data Sep. 30, 1987 [JP] Japan .................. 62-246095
Sep. 30, 1987 [JP] Japan .................. 62-246096
Sep. 30, 1987 [JP] Japan .................. 62-246097

[51] Int. Cl.⁵ .................................................. G11B 7/00
[52] U.S. Cl. .................................. 369/44.11; 369/44.21
[58] Field of Search ................................ 369/43–47, 369/32; 358/342; 250/201

[56] References Cited

U.S. PATENT DOCUMENTS 4,616,353 10/1986 Kaneda et al. .................. 369/43
4,663,750 5/1987 Hamanaka et al. ............... 369/45
4,812,726 3/1989 Benii et al. ..................... 318/640

FOREIGN PATENT DOCUMENTS 0127845 12/1984 European Pat. Off.
3438260A1 5/1985 Fed. Rep. of Germany.

OTHER PUBLICATIONS

English Translation of West German Patent Application DE 3743884A1.
English Translation of German Patent Office Action Dated 6/14/88.

*Primary Examiner*—Robert L. Richardson
*Attorney, Agent, or Firm*—Finnegan, Henderson, Farabow, Garrett, and Dunner

[57] ABSTRACT

A light beam detector receiver a light beam reflected from an optical disk and generates two electrical signals, each corresponding to the amount of the light beam. The detector includes an adder for adding the two electrical signals to generate a first operation signal, a subtracter for subtracting one electrical signal from the other to generate a second operation signal, and a converter for converting the second operation signal into digital data in accordance with a conversion gain determined by the amplitude of the first operation signal. The digital data obtained is used for adjusting a position of an objective lens with respect to the optical disk.

9 Claims, 5 Drawing Sheets

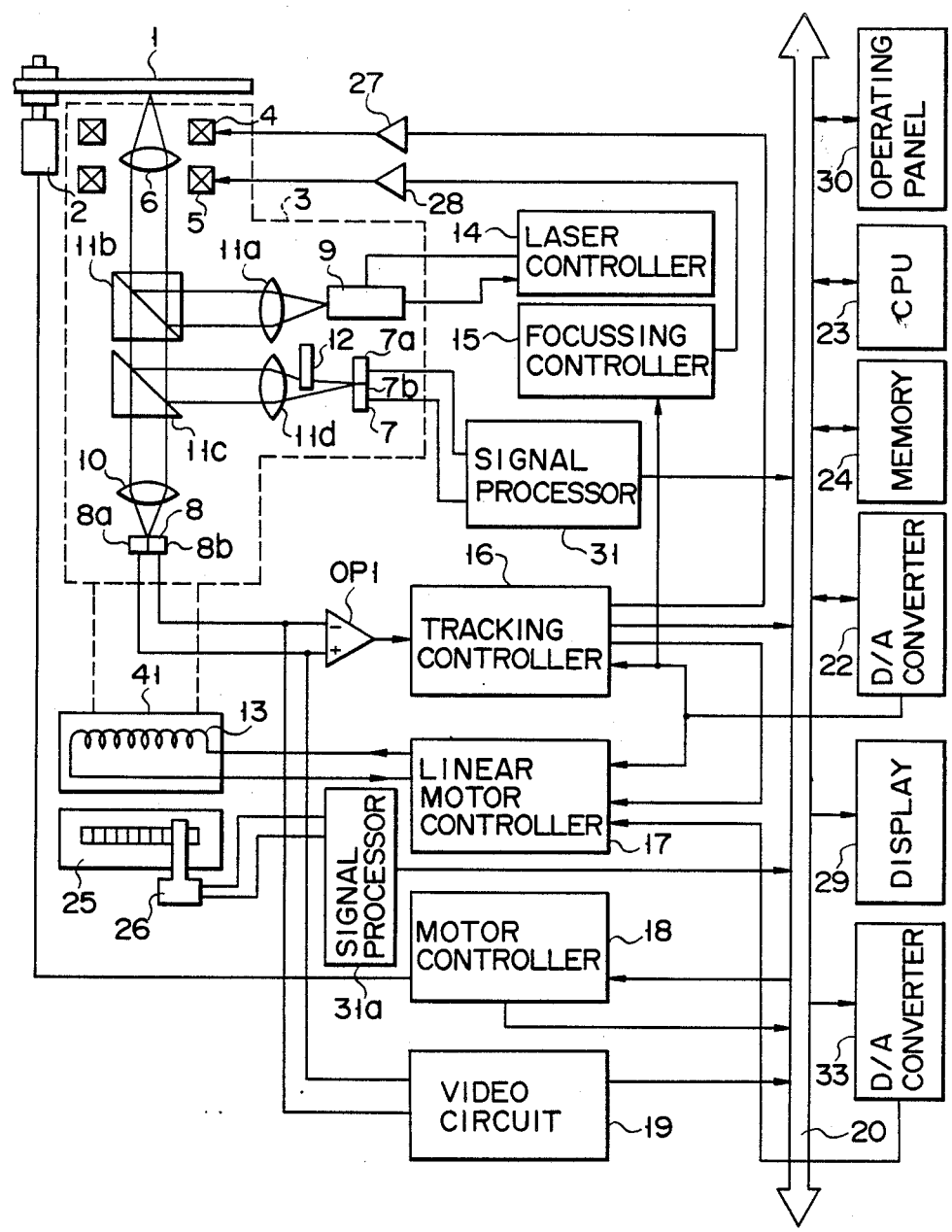
F I G. 1

| Vin | CONVERSION DATA |
|---|---|
| +Vref(V) | FFH |
| ⋮ | ⋮ |
| 0 (V) | 80H |
| ⋮ | ⋮ |
| -Vref(V) | 00H |

SMALL AMOUNT OF LIGHT

LARGE AMOUNT OF LIGHT

| Vin | CONVERSION DATA |
|---|---|
| +Vref | FFH |
| ⋮ | ⋮ |
| +½Vref | 80H |
| ⋮ | ⋮ |
| 0 | 00H |

SIGNAL PROCESSING APPARATUS AND METHOD CAPABLE OF PROVIDING PRECISE DIGITAL DATA

BACKGROUND OF THE INVENTION

1. Field of the Invention

The invention relates to a signal processing apparatus, and more particularly a signal processing apparatus and a method used in an optical disk apparatus for converting a focus-error signal, track-error signal or the like into digital data.

2. Description of the Related Art

Optical disk apparatus require several control systems in order to precisely record or reproduce data. One of them is a focusing control system. The focusing control is to detect the focusing error caused by the surface deflection or up-down movement of the disk surface while the optical disk is rotating, and move an optical system such as an objective lens in parallel with the optical axis of the laser beam according to the amount of detected focusing error so as to accomplish optical focusing. In order to detect the focusing error, for example, a pair of photosensors are used to derive a difference between two outputs therefrom. Then, current corresponding to the signal difference is supplied to an objective lens driving coil to set the objective lens into the correct focusing position (focused position). That is, the laser beam is focused on the optical disk by use of a condenser lens, the reflected light from the optical disk is applied to the pair of photosensors, and then focusing control is effected to reduce the difference between the two outputs from the photosensors to zero.

In general, in the data recording operation, the laser beam output is set larger than in the data reproducing operation, and therefore the amount of light applied to the pair of photosensors becomes large, causing a larger photosensor output current to be supplied. As a result, the loop gain of a focusing controller becomes large. Conventionally, in order to keep the loop gain of the focusing controller at a constant value and stabilize the servo system, an analog divider or digital divider is used to normalize the photosensor output.

In a case where the analog divider is used, a difference signal of two output signals is divided (normalize) by a sum signal thereof, the result is subjected to A/D conversion process, and then the focusing control operation is effected according to digital data obtained in the A/D conversion process. In contrast, when the digital divider is used, a difference signal of two output signals and a sum signal thereof are subjected to A/D conversion process, respectively, and then the focusing control operation is effected according to digital data obtained by dividing the A/D converted data by use of the digital divider.

However, when the analog or digital divider is used, the focusing controller will become large in size and extremely expensive. In particular, when the digital divider is used, it is necessary to provide a high reference voltage in order to attain precise A/D conversion when a larger amount of light is applied to the photosensors. In contrast, when the amount of incident light is small, the reference voltage becomes low and the resolution for the A/D conversion is lowered. With the fact described above taken into consideration, it has been proposed to provide a device which can derive out precise digital data.

SUMMARY OF THE INVENTION

An object of this invention is to provide a signal processing apparatus for providing precise digital data without making the construction complex.

Another object of this invention is to provide a signal processing method for providing precise digital data without making the construction complex.

One of the above objects can be attained by an apparatus for processing signals from a detector, the detector having at least first and second areas for generating electrical signals upon receiving a physical quantity, comprising first operation means for deriving out the sum of the electrical signals from at least the first and second areas of the detector to generate a first operation signal, the first operation signal having a predetermined amplitude, second operation means for deriving out the difference between the electrical signals from at least the first and second areas of the detector to generate a second operation signal, and converting means for converting the second operation signal generated by the second operation means into digital data in accordance with a conversion gain determined by the amplitude of the first operation signal generated by the first operation means.

The other object can be attained by a method of detecting a light beam from an optical memory, comprising the steps of focusing the light beam onto the optical memory by an optical element, detecting the light beam from the optical memory by a detector, the detector having a first detecting portion for generating a first signal corresponding to the amount of the light beam detected thereby and a second detecting portion for generating a second signal corresponding to the amount of the light beam detected thereby, adding the first signal and the second signal by an adder so as to generate a first operation signal, the first operation signal having a predetermined amplitude, subtracting the second signal from the first signal by a subtracter so as to generate a second operation signal, converting the second operation signal generated by the subtracter into the digital data by a converter in accordance with a conversion gain determined by the amplitude of the first operation signal generated by the adder, and adjusting the location of the optical element with respect to the optical memory by an adjuster in accordance with the digital data.

BRIEF DESCRIPTION OF THE DRAWINGS

The foregoing aspects and other features of the invention will be explained in the following description taken in conjunction with the accompanying drawings wherein;

FIG. 1 is a schematic block diagram of an optical disk apparatus to which a signal processor of this invention is applied;

DETAILED DESCRIPTION OF THE PREFERRED EMBODIMENTS

Figures 2, 3:
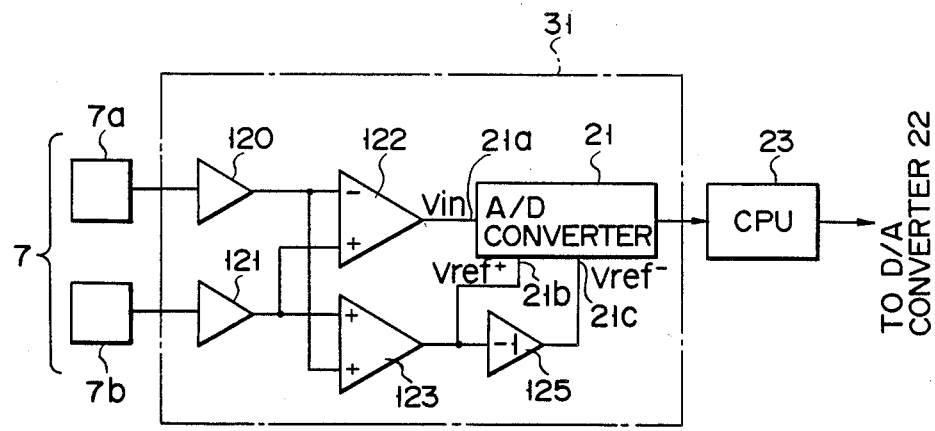
FIG. 2 is a diagram showing a signal processor according to one embodiment of this invention.
FIG. 3 shows the relation between a reference voltage defining the digital conversion range for an analog input signal and converted data in the embodiment shown in FIG. 2.

There will now be described an embodiment of this invention with reference to the accompanying drawings.

FIG. 1 is a block diagram of an optical disk apparatus in which signal processors 31 and 31a are used.

Optical disk 1 is rotated at a constant speed by means of D.C. motor 2 which is controlled by motor controller 18. Data recording and reproduction with respect to optical disk 1 are effected by means of optical pick-up 3. Optical pick-up 3 is fixed on driving coil 13 constituting the moving portion of linear motor 41, and driving coil 13 is connected to linear motor controller 17. Linear motor position detector 26 connected to signal processor 31a is designed to detect the indication of optical scale 25 mounted on optical pick-up 3 and generate two output signals relating to the position of optical scale 25. The output signals are subjected to a predetermined processing by signal processor 31a as will be described later, and then they are supplied to linear motor controller 17 via CPU 23 and D/A converter 33. Linear motor controller 17 controls linear motor 41 according to the received signals.

A permanent magnet (not shown) is mounted on the fixed portion of linear motor 41. When driving coil 13 is excited by linear motor controller 17, optical pick-up 3 is moved in a radial direction of optical disk 1.

Optical pick-up 3 includes semiconductor laser 9, collimator lens 11a, beam splitter 11b, objective lens 6, half prism 11c, focusing lenses 10 and 11d, knife edge 12, and photo-detectors 7 and 8.

When data is recorded or reproduced, semiconductor laser 9 is driven by laser controller 14. Laser beam generated from laser 9 is transmitted to and collimated by collimator lens 11a. Beam splitter 11b divides the collimated light beam into two beam components one of which is transmitted to objective lens 6. Objective lens 6 focuses the light beam on a preset track on the surface of optical disk 1. Light reflected from optical disk 1 is transmitted to half-prism 11c via objective lens 6 and beam splitter 11b, and is then divided into two light components. One of the light components divided by half-prism 11c is transmitted to photodetector 8 via condenser lens 10. The other light component is transmitted to photo-detector 7 via condenser lens 11d and knife edge 12.

Optical pickup 3 further comprises drive coils 4 and 5 to drive objective lens 6. This objective lens 6, when driven by drive coil 5, is movable along the optical axis of lens 6, and is movable along the surface of optical disk 1 when driven by drive coil 4.

Photo-detector 7, which consists of two photodetector cells 7a and 7b, outputs two electrical signals therefrom upon receiving the light. The output signals are subjected to a predetermined signal processing in signal detector 31, and supplied to focusing controller 15 via CPU 23 and D/A converter 22. An output signal of focusing controller 15 is supplied to focusing driving coil 5 and controlled to cause the laser beam to be focused on optical disk 1.

Photo-detector 8, which consists of two photo-detector cells 8a and 8b, outputs two electrical signals therefrom upon receiving the light. The two output signals are supplied to differential amplifier OP1 which in turn generates a difference signal therebetween. The difference signal corresponds to the tracking error. The tracking error signal is supplied to tracking controller 15 which in turn supplies a tracking control signal to linear motor controller 17 and driving coil 4 for tracking control.

Outputs of photo-detector 8 are also supplied to video circuit 19 in which image data and address data (track number, sector number and the like) are reproduced. The reproduced data can be displayed on display 29 after being processed.

Laser controller 14, focusing controller 15, tracking controller 16, linear motor controller 17, motor controller 18, and video circuit 19 are controlled by means of CPU 23 via bus line 20. CPU 23 performs predetermined tasks according to the program stored in memory 24 in response to instructions entered via operation panel 30. Further, D/A converter 22 is provided to permit data to be transferred between CPU 23 and each of focusing controller 15, tracking controller 16 and linear motor controller 17.

FIG. 2 is a diagram showing a signal processor 31 according to one embodiment of this invention. Signal processor 31 includes amplifier circuits 120 and 121, differential amplifier 122, adder 123, A/D converter 21 and inverting amplifier 125.

Now, the focusing control operation effected by use of signal processor 31 of this invention is explained. Outputs of photo-detector cells 7a and 7b constituting photo-detector 7 are respectively supplied to amplifier circuits 120 and 121. An output of amplifier circuit 121 is supplied to a non-inverting input terminal of differential amplifier 122 and to an input terminal of adder 123 functioning as an addition circuit. An output of amplifier circuit 120 is supplied to an inverting input terminal of differential amplifier 122 functioning as a subtracter. An output of differential amplifier 122 is supplied as an analog input signal (Vin: focus error signal) to signal input terminal 21a of A/D converter 21. An output (sum signal) of adder 123 is supplied as a reference voltage (Vref+) to reference voltage input terminal 21b of A/D converter 21, and at the same time supplied as a reference voltage (Vref−) to reference voltage input terminal 21c of A/D converter 21 via inverting amplifier 125. A/D converter 21 converts an analog input signal (focus-error signal) supplied from differential amplifier 122 into digital data (focus-error detection signal) according to the conversion characteristics corresponding to the reference voltages (Vref+ and Vref−) supplied from adder 123 and from inverting amplifier 125.

As shown in FIG. 3, the conversion characteristics is so determined as to divide the range between the reference voltages "Vref+" and "Vref−" into a plurality of voltage values and allot corresponding digital values of respective voltage values. For example, digital values "$FF_H$", "$80_H$" and "$00_H$" are respectively allotted to corresponding reference voltages "+Vref(V)", "0(V)", and "−Vref(V)".

Figure 4A:
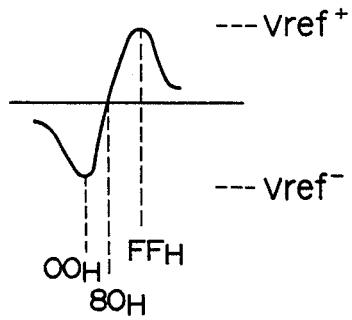
FIGS. 4A and 4B are waveform diagrams indicating a reference voltage varying according to different amounts of incident light in the embodiment of FIG. 2.
Figure 4B:
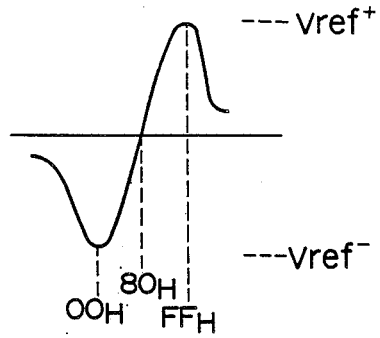

In this way, the conversion gain with which the analog signal supplied as the focus-error signal is converted into digital data ca be controlled according to the result of addition of adder 123 or the sum of the amounts of light incident to photo-detector 7. For example, in a case where the amount of light incident to photo-detector 7 is small (in the reproducing mode), a reference voltage of low voltage level is used for conversion of an analog signal into digital data as shown in FIG. 4A, and when the incident light amount is large (in the recording mode), a reference voltage of high voltage level is used for conversion of an analog signal into digital data as shown in FIG. 4B.

Thus, even if the amount of light incident to photo-detector 7 is changed according to variation in the intensity of the laser beam in the recording and reproducing modes, the analog-digital conversion can be effected with constant detection characteristics.

An output of A/D converter 21 is supplied to central processing unit (CPU) 23 functioning as a signal processing circuit. CPU 23 performs various processings such as phase compensation and the make or break of the focusing control loop when digital data is supplied from A/D converter 21. After the completion of the processings, CPU 23 supplies output data to D/A converter 22. D/A converter 22 converts output data from CPU 23 into an analog signal (focus-error correction signal) and supplies the converted signal to focusing controller 15.

Focusing controller 15 supplies a corresponding amount of current to coil 5 according to the amplitude of a signal supplied from D/A converter 22 so as to move objective lens 6 by a corresponding distance in a direction perpendicular to the recording surface of optical disk 1 (along the optical axis of the laser beam). As a result, objective lens 6 is brought into the focusing position.

Now, the operation of the circuit shown in FIG. 2 is explained. In the data reproducing mode, continuous weak laser beam is generated from semiconductor laser 14. In contrast, in the data recording mode, a large current is intermittently supplied to semiconductor laser 14 so as to cause semiconductor laser 14 to intermittently generate strong laser beam. In this way, laser beam of high intensity (recording beam) is generated from semiconductor laser 14 in the recording mode, and laser beam of low intensity (reproducing beam) is generated from semiconductor laser 14 in the reproducing mode.

In each of the recording and reproducing modes, the reflected light from optical disk 1 is converted into parallel light beam by means of objective lens 6. The parallel light is reflected toward projection lens 11d by half-prism 11c after passing through beam splitter 11b, and is then applied to photo-detector 7 by means of projection lens 11d. Thus, electrical signals corresponding to the incident light are generated from photodetector cells 7a and 7b and supplied to amplifier circuits 120 and 121, respectively.

Output signals from amplifier circuits 120 and 121 are supplied to differential amplifier 122 and adder 123. Then, differential amplifier 122 supplies an output signal corresponding to a difference between detection signals from photo-detector cells 7a and 7b to A/D converter 21.

Adder 123 generates a sum signal corresponding to the total sum of amounts of light incident to photodetector 7 and obtained by adding together detection signals of photo-detector cells 7a and 7b, and supplies the sum signal to reference voltage input terminal 21b of A/D converter 21. Further, the sum signal from adder 123 is inverted by inverting amplifier 125 and then supplied to reference voltage input terminal 21c of A/D converter 21.

As a result, A/D converter 21 converters an analog input signal supplied as a focus-error signal from differential amplifier 122 into digital data according to the conversion characteristic determined by the reference voltages (Vref+ and Vref−) supplied from adder 123 and inverting amplifier 125.

In this way, even when detection levels of photodetector cells 7a and 7b are changed with variation in the intensity of the laser beam in the recording and reproducing modes, digital data can be obtained with constant detection characteristics.

Digital data from A/D converter 21 is supplied to CPU 23. CPU 23 processes digital data from A/D converter 21 and supplies an output to D/A converter 22 which in turn generates a focus-error correction signal.

Focusing controller 15 supplies a predetermined current to coil 5 in response to the focus-error correction signal from D/A converter 22 to drive objective lens 6 in an optical axis direction for focusing. Thus, the beam spot can be set on the focusing position.

In this way, in the above embodiment, the laser beam generated from semiconductor laser 9 is focused on optical disk 1 by use of objective lens 6, and at least two signals are detected by using light reflected from optical disk 1. Further, a subtraction signal (focus-error signal) and an addition signal (sum signal) are derived based on the detected signals. Then, a reference voltage of A/D converter 21 is determined by the addition signal, and the subtraction signal is converted into digital data with a conversion gain corresponding to the reference voltage. The digital data is used to perform precise focusing control. That is, when the focus-error signal derived out by means of photodetector 7 is A/D converted by using the sum signal as the reference voltage of A/D converter 21, normalization can also be effected.

Since the sum signal is small in the reproducing mode, for example, the conversion gain with which an analog signal or focus-error signal is converted into digital data is increased. In contrast, the sum signal becomes large in the recording mode, and therefore the conversion gain becomes small, thus making it possible to keep the gain of the entire control system constant.

Therefore, stable and precise focusing control can be effected without causing significant variation in the loop gain and using expensive parts such as analog dividers.

In the above embodiment, the focusing control is explained, but it is also possible to effect the tracking control in the same manner as the focusing control. That is, in this case, tracking error is detected by means of photo-detector cells 8a and 8b, and then objective lens 6 is driven by means of coil 4 based on the detected error so as to move it by a corresponding amount along the surface of the optical disk 1.

Further, in the above embodiment, although the signal processor 31 including adder 123 and inverting amplifier 125 is explained, signal processor 31 can also be constituted by using a constant voltage circuit to prevent the reference voltage from being set lower than a preset voltage level. Such a constant voltage circuit is shown in FIG. 5.

Figure 5:
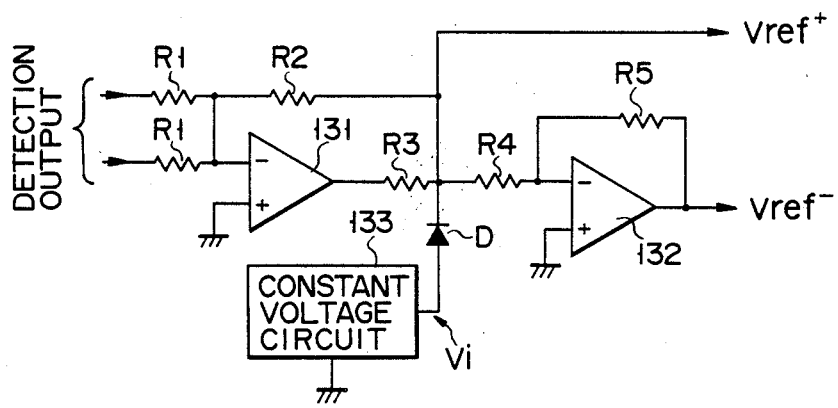
FIG. 5 is a diagram showing the embodiment of this invention of FIG. 2 in a case where a sum-signal processing circuit including a constant voltage circuit is used.

The circuit of FIG. 5 includes resistors R1, R2, R3, R4 and R5, differential amplifiers 131 and 132, diode D and constant voltage circuit 133. With this circuit construction, reference voltages Vref+ and Vref− can be so set as to satisfy the following relation. That is, reference voltage Vref+ $\geq$ (output voltage Vi of constant voltage circuit 133—forward voltage drop of diode D), and reference voltage Vref− $\leq$ −(output voltage Vi of constant voltage circuit 133—forward voltage drop of diode D). Under this condition, it is prevented that the conversion gain of A/D converter 21 (see FIG. 2) becomes too large to cause erroneous operation when the sum of the two detection outputs approaches zero (when no light is reflected from optical disk 1 while no laser beam is generated, or when objective lens 6 is set far away from the focus point).

It is explained that optical disk 1 is used as recording medium, but it is also possible to use laser card or the like.

Further, the coil can be driven by using the pulse width control without using the D/A converter.

Figures 6, 7:
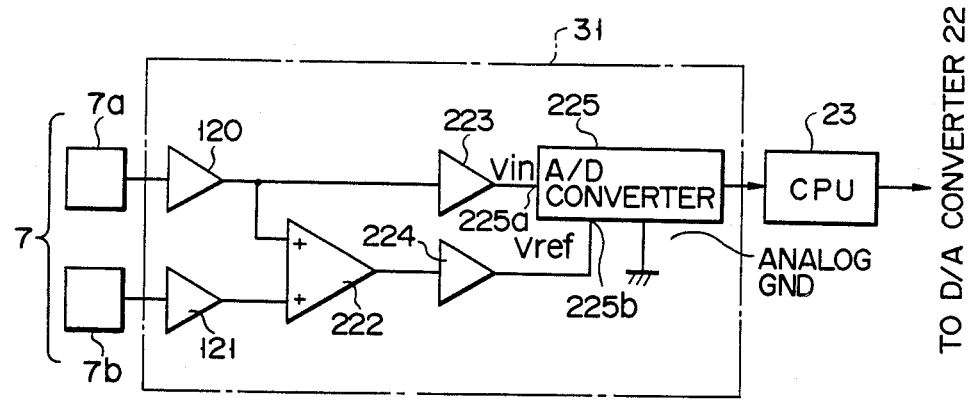
FIG. 6 is a diagram showing a signal processor according to another embodiment of this invention.
FIG. 7 shows the relation between a reference voltage defining the digital conversion range for an analog input signal and conversion data in the embodiment shown in FIG. 6.

FIG. 6 is a diagram showing another embodiment of signal processor 31 according to this invention. Signal processor 31 includes amplifier circuits 120 and 121, adder 222, amplifier circuits 223 and 224, and A/D converter 225.

As in the former embodiment, outputs from photodetectors 7a and 7b are supplied to and amplified by amplifier circuits 120 and 121. Outputs of amplifier circuits 7a and 7b are supplied to input terminals of adder 222 functioning as an addition circuit. Further, an output of amplifier circuit 120 is amplified by means of amplifier circuit 223 and then supplied to signal input terminal 225a of A/D converter 225 as an analog input signal (Vin: focus-error signal) to be converted into digital data. An output signal (sum signal) of adder 222 is amplified by means of amplifier circuit 224 and then supplied as a reference voltage (Vref+) to reference voltage input terminal 225b of A/D converter 225.

A/D converter 225 determines the conversion range of an input analog signal (Vin: detection signal by photo-detector cell 7a; corresponding to the focus-error signal) supplied from amplifier circuit 223 based on the analog ground value (0 V; reference voltage) and the reference voltage (Vref+) supplied from amplifier circuit 224. Therefore, the analog input signal is converted into digital data (focus-error detection signal) with the conversion characteristics corresponding to the conversion range.

As shown in FIG. 7, the conversion characteristics are so determined as to divide the range between the reference voltage "+Vref(V)" and "0" into a plurality of voltage values and allot corresponding digital values for respective voltage values. For example, digital values "FF$_H$", "80$_H$" and "00$_H$" are respectively allotted to corresponding reference voltages "+Vref(V)", "+½Vref(V)" and "0(V)".

Figure 8:
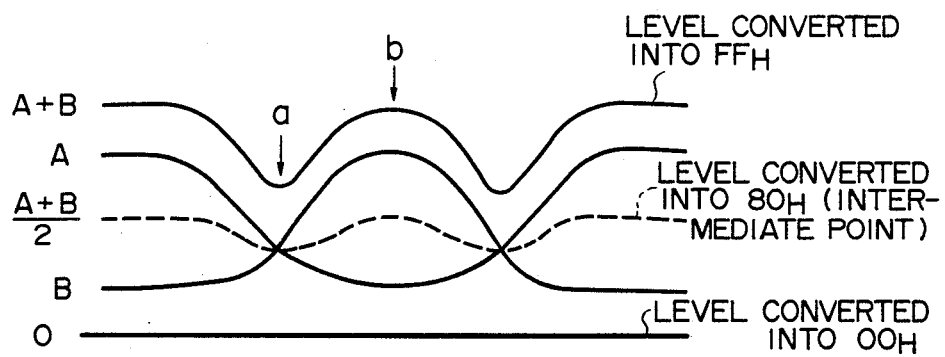
FIG. 8 is a diagram indicating digital data to be obtained by converting a reference voltage varying according to different amounts of incident light in the embodiment of FIG. 6.

In a case where the analog input signal supplied from amplifier circuit 223, i.e., the detection signal from photo-detector cell 7a has a voltage level corresponding to "+Vref(V)" or "0(V)", the position farthest from the focusing position is indicated. In contrast, when it has a voltage level corresponding to "+½Vref(V)", an intermediate position (focusing position) is indicated. In this way, the conversion range in which the analog signal or the focus-error signal supplied from photo-detector cell 7a is converted into digital data can be controlled according to the total amount of light incident to photo-detector 7 or the result of addition by adder 222. Assume that A and B denote output signals of photo-detector cells 7a and 7b in FIG. 8. In a case where the amount of incident light is small (in the reproducing mode), output signal A of photo-detector cell 7a is converted into digital data with narrower conversion range as shown by point a. In contrast, in a case where the amount of incident light is large (in the recording mode), output signal A is converted into digital data with wider conversion range as shown by point b. Thus, even if the amount of light incident to photo-detector 7 is changed, or when the detection levels of photo-detector cells 7a and 7b are changed by variation in the intensity of the laser beam in the recording and reproducing modes, digital data can be obtained with constant detection characteristic.

An output of A/D converter 225 is supplied to CPU 23 functioning as a digital signal processing circuit. CPU 23 performs the processings such as phase compensation, offset addition, addition of focusing pull-in signals, and the make or break of the focusing control loop with respect to digital data supplied from A/D converter 225. Output data subjected to the above processings by CPU 23 is supplied to D/A converter 22 which in turn converts the data into an analog signal (focus-error correction signal) and supplies the converted signal to focusing controller 15. Focusing controller 15 supplies a corresponding current to coil 5 in response to the signal supplied from D/A converter 22 to move objective lens 6 in a direction (along the optical axis of the laser beam) perpendicular to the recording surface of optical disk 1, thus correcting the focusing error.

Next, the operation of signal processor 31 shown in FIG. 6 is explained. As in the embodiment of FIG. 2, light reflected from optical disk 1 is converted into parallel light beam by means of objective lens 6 in the recording and reproducing modes. The laser beam converted into parallel form is reflected toward projection lens 11d by half-prism 11c after passing through beam splitter 11b, and is then applied to photo-detector 7 by means of projection lens 11d. Thus, electrical signals corresponding to the incident light are generated from photo-detector cells 7a and 7b and supplied to amplifier circuits 120 and 121, respectively. Output signals from amplifier circuits 120 and 121 are supplied to adder 222. Adder 222 generates an output signal corresponding to the sum of detection signals from photo-detector cells 7a and 7b. The sum signal corresponds to the amount of light incident to photo-detector cells 7a and 7b. The sum signal is amplified by amplifier circuit 224 and then supplied to reference voltage input terminal 225b of A/D converter 225.

A/D converter 225 determines the conversion range based on the analog ground value (0 V; reference voltage) and the reference voltage (Vref+) supplied from amplifier circuit 224. Therefore, the analog input signal (Vin: detection signal by photo-detector cell 7a; corresponding to the focus-error signal) supplied from amplifier circuit 223 is converted into digital data (focus-error detection signal) with the conversion characteristic corresponding to the conversion range.

Thus, even if the detection levels of photodetector cells 7a and 7b are changed by variation in the intensity of the laser beam in the recording and reproducing modes, digital data can be obtained with constant detection characteristic.

Digitized focus-error signal from A/D converter 225 is supplied to CPU 23. CPU 23 processes the digital data from A/D converter 225 and supplies an output to D/A converter 22 which in turn generates a focus-error correction signal. Focusing controller 15 supplies a predetermined current to coil 17 in response to the focus-error correction signal from D/A converter 22 to drive objective lens 6 in an optical axis direction for focusing control. Thus, the beam spot can be set on the focusing position. In this way, in the above embodiment, the laser beam generated from semiconductor laser 9 is focused on optical disk 1 by use of objective lens 6, and at least two signals are detected by using light reflected from optical disk 1. Further, an addition signal (sum signal) is derived based on the detected signals, and a reference voltage of A/D converter 21 is determined by the addition signal. Further, the detected reference voltage and predetermined reference voltage (analog ground value) are used to determine the conversion range, and the detected signals are converted into digital data. Then, the objective lens is driven according to the digital data. That is, when the focus-error signal or one of the two detected signals from photo-detector 7 is A/D converted by using the sum of the detected signals as the reference voltage of A/D converter 21, normalization can also be effected.

Since the sum signal derived out by means of photodetector 7 is used as the reference voltage of A/D converter 21, the sum signal is small in the reproducing mode. Therefore, the conversion gain with which an analog signal is converted into digital data becomes large. In contrast, since the sum signal becomes large in the recording mode, the conversion range in which an analog signal is converted into digital data become small, thus making it possible to keep the conversion characteristic of the entire control system constant.

Therefore, stable and precise focusing control can be effected without causing significant variation in the loop gain and using expensive parts such as analog dividers.

In the above embodiment, the focusing control is explained, but it is also possible to effect the tracking control by use of the same construction as that used for the focusing control.

That is, in this case, tracking error is detected by means of photo-detector cells 8a and 8b, and then objective lens 6 is driven by electromagnetic force generated by coil 4 based on the detected error so as to move it by a corresponding amount along the surface of optical disk 1.

Further, in the above embodiment, it is explained that the sum signal from adder 222 is applied as the reference signal to A/D converter 225. However, it is also possible to use a constant voltage circuit so as to prevent the reference voltage from being set lower than a preset voltage level. Such a constant voltage circuit is shown in FIG. 9.

Figure 9:
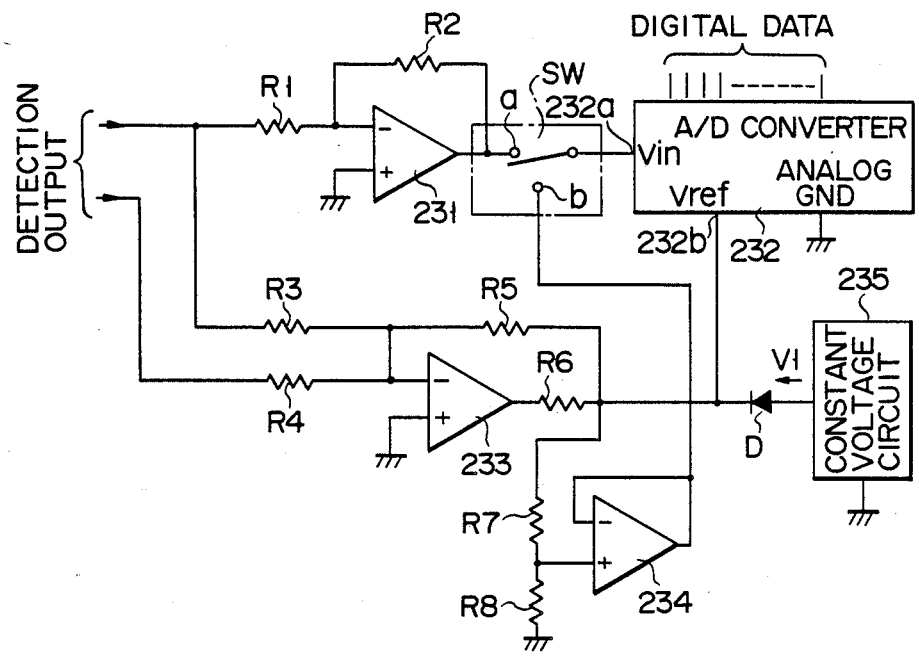
FIG. 9 is a diagram showing the embodiment of this invention of FIG. 6 in a case where a sum-signal processing circuit including a constant voltage circuit is used.

The circuit of FIG. 9 includes resistors R1 to R8, amplifiers 231, 233 and 234, switch SW, diode D, A/D converter 232 and constant voltage circuit 235.

With this circuit construction, reference voltage Vref+ to A/D converter 232 can be set so as not to become lower than the difference between output voltage V1 of constant voltage circuit 235 and the forward voltage drop of diode D. As a result, it is prevented that the conversion gain of A/D converter 232 becomes too large.

In this way, it is prevented that the conversion gain of A/D converter 232 becomes too large to cause erroneous operation when the sum of the two detection outputs approaches zero (when no light is reflected from the optical disk while no laser beam is generated, or when the objective lens is set far away from the focus point).

In order to correct offset or the like, switch SW is set from switching position a to switching position b by means of CPU 23 so that half the sum of the detection signals generated from amplifier 234, or ½ Vref+ can be supplied to signal input terminal 232a of A/D converter 232. CPU 23 stores digital data (80$_H$) from A/D converter 232 into data memory (not shown).

After this, CPU 23 sets switch SW from switching position b to switching position a so that a detection signal from amplifier 231 or detection signal from photo-detector cell 7a can be supplied to signal input terminal 232a of A/D converter 232. As a result, digital data from A/D converter 232 is compared with digital data (80$_H$) stored in the data memory by means of CPU 23, and the difference therebetween is stored as offset correction (error) data into the data memory.

In this way, the offset error can be corrected by use of the offset correction data.

Further, it is possible to drive coils 5 by use of the pulse width control method. It is explained in the above embodiment that the focusing error signal is detected in terms of digital data. However, the same operation can be effected in a detection system which detects physical quantity by using a difference between detection signals from two systems. For example, the above operation can be effected in optical head feeders (optical scales), magnetic head feeders or the like.

Figure 10:
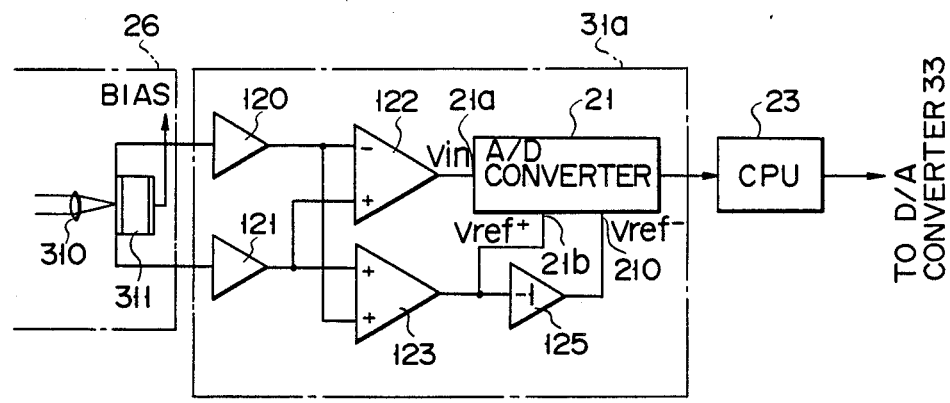
FIG. 10 is a diagram showing a signal processor according to one embodiment of this invention in a case where the signal processor of FIG. 2 is used in a portion other than the optical disk apparatus.

FIG. 10 shows signal processor 31a obtained by modifying signal processor of FIG. 2 to perform the position detection of optical scale 25 by use of a beam spot.

For example, a beam spot formed by reflected light from optical scale 25 is transmitted to semiconductor position detector 311 via lens 310 mounted on position detector 26. Semiconductor position detector (PSD) 311 is formed of, for example, a silicon photodiode so as to generate position detection signals of the beam spot by converting light image formed by lens 310 into two electrical signals.

Figure 11:
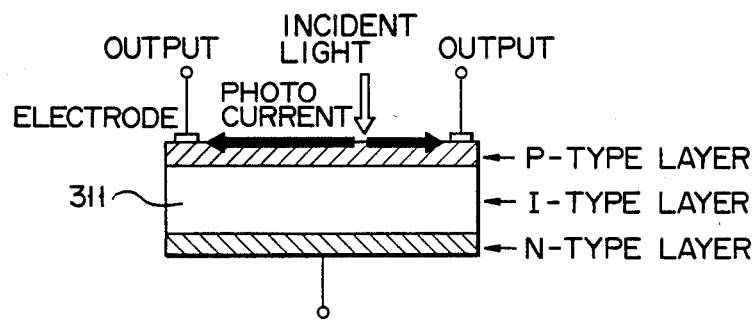
FIG. 11 is a cross sectional view showing the construction of a semiconductor detector element used in the embodiment of FIG. 10.

As shown in FIG. 11, for example, the photodiode has three-layered structure of plate-like silicon in which the upper and lower surface layers are formed of P-type and N-type layers, respectively, and the intermediate layer is formed of an I-type layer. A light beam spot incident to the photodiode is converted into electrical signals, and they are derived separately as photocurrents (detection signals) by means of two electrodes formed on the P-type layer.

Two detection outputs of semiconductor position detector 311 are respectively supplied to amplifier circuits 120 and 121 for amplication. Outputs of amplifier circuit 120 and 121 ar respectively supplied to inverting and non-inverting input terminals of subtraction circuit or differential amplifier 122 and to input terminals of adder 123 functioning as an addition circuit. An output of differential amplifier 122 is supplied as an analog input signal (Vin: difference signal) to signal input terminal 21a of A/D converter 21. An output of adder 123 is supplied as a reference voltage (Vref+) to reference voltage input terminal 21b of A/D converter 21, and at the same time, supplied as reference voltage (Vref−) to reference voltage input terminal 21c of A/D converter 21 via inverting amplifier 125.

A/D converter 21 converts an analogs input signal (difference signal) supplied from differential amplifier 122 into digital data as the position detection signal according to the conversion characteristic corresponding to the reference voltages (Vref+ and Vref−) supplied from adder 123 and inverting amplifier 125. As shown in FIG. 3, the conversion characteristic is so determined as to divide the range between the reference voltages "Vref+" and "Vref−" into a plurality of voltage values and allot corresponding digital values for respective voltage values. For example, digital values "$FF_H$", "$80_H$" and "$00_H$" are respectively allotted to corresponding reference voltages "+Vref(V)", "0(V)" and "−Vref(V)".

Figures 12A, 12B:
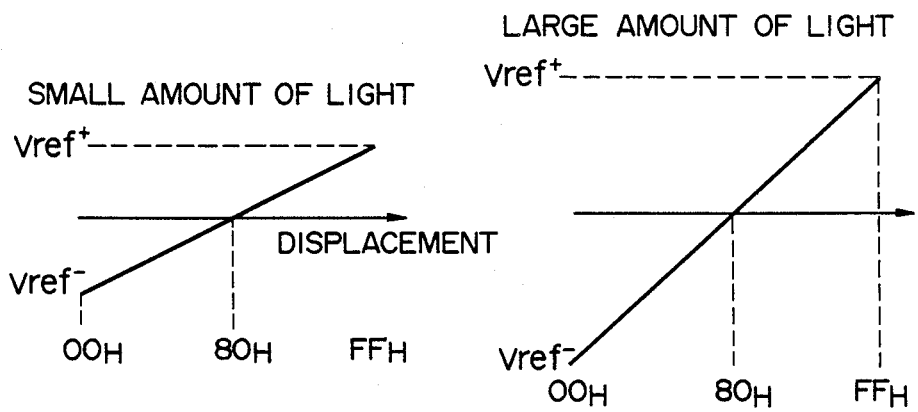
FIGS. 12A and 12B are waveform diagrams indicating a reference voltage varying according to different amounts of incident light in the embodiment of FIG. 10.

In this way, the conversion gain with which the difference signal is converted into digital data can be controlled according to the result of addition by adder 123 or the total sum of the amounts of light incident to semiconductor position detector 311. For example, in a case where the amount of light incident to semiconductor position detector 311 is small, a reference voltage of low voltage level is used for conversion of an analog signal into digital data as shown in FIG. 12A, and when the incident light amount is large, reference voltage of high voltage level is used for conversion of an analog signal into digital data as shown in FIG. 12B.

Thus, even if the amount of light incident to semiconductor position detector 311 is changed, the analog signal can be converted into digital data as the position detection signal with constant detection characteristics.

An output of A/D converter 21 is supplied to central processing unit (CPU) 23 functioning as a digital signal processing circuit. CPU 23 performs various processings such as phase compensation, offset addition and the made or break of the focusing control loop when digital data is supplied form A/D converter 21. After the completion of the processings, output data from CPU 23 is converted into an analog signal by D/A converter 33 and then supplied to linear motor controller 17. Linear motor controller 17 drives linear motor 41 in response to the received analog signal to move optical pick-up 3 by a corresponding distance.

Next, the operation of the circuit shown in FIG. 10 is explained. Assume now that a beam spot is projected onto semiconductor position detector 311 via lens 310. Then, two output signals corresponding to the beam spot are generated from semiconductor position detector 311 and respectively supplied to amplifier circuits 120 and 121.

Now, the position detection operation is explained. Output signals of amplifier circuits 120 and 121 are supplied to differential amplifier 122 and adder 123 respectively. Differential amplifier 122 supplies a signal corresponding to a difference between the two detection signals of semiconductor position detector 311 to A/D converter 21.

Further, adder 123 generates a signal corresponding to the amount of light incident to semiconductor position detector 311, and supplies the signal to reference voltage input terminal 21b of A/D converter 21. An addition signal from adder 123 is also inverted by means of inverting amplifier 125 and then supplied to reference voltage input terminal 21c of A/D converter 21. As a result, A/D converter 21 converts the analog signal (difference signal) supplied from differential amplifier 122 into digital data with the conversion characteristics corresponding to reference voltage (Vref+ and Vref−) supplied from adder 123 and inverting amplifier 125. Thus, even if the light amount of the beam spot is changed, digital data as the position detection signal can be obtained with constant detection characteristic.

Digital data from A/D converter 21 is supplied to CPU 23 which in turn performs predetermined processings to supply output analog signal to linear motor controller 17 via D/A converter 33. Linear motor controller 17 drives linear motor 41 in response to the analog signal to move optical pick-up 3 to a desired position.

In this way, in the above embodiment, two detection signals are derived from the beam spot, and a subtraction signal (difference signal) and addition signal (sum signal) are derived based on the detected signals. Thus, a reference voltage of A/D converter 21 is determined by the addition signal, and the subtraction signal is converted into digital data as the position detection signal according to the reference voltage. That is, when the difference between the detection signals from semiconductor position detector 311 is A/D converted by using the sum of the detection signals from semiconductor position detector 311 as the reference voltage of A/D converter 21, normalization can also be effected.

Since the sum signal derived out by use of semiconductor position detector 311 is used as the reference signal of A/D converter 21, the sum signal becomes small when the incident light amount is small, for example. In this case, the conversion gain with which an analog signal or difference signal is converted into digital data becomes large. In contrast, the sum signal becomes large when the incident light amount is large, and therefore the conversion gain becomes small, thus making it possible to keep the gain of the entire control system constant.

Therefore, stable and precise position detection can be effected without causing signification variation in the loop gain and using expensive parts such as analog dividers.

In the above embodiment, it is explained that the position detection is attained by use of the beam spot. However, the same operation can be effected in a detection system which detects physical quantity by using a difference between detection signals from two systems.

Further, in the above embodiment, although the signal processor 31a including adder 123 and inverting amplifier 125 is explained, signal processor 31a can also be constituted by using the constant voltage circuit as shown in FIG. 5 to prevent the reference voltage from being set lower than a present voltage level.

As described above, the circuit of FIG. 5 includes resistors R1, R2, R3, R4 and R5, differential amplifiers 131 and 132, diode D and constant voltage circuit 133.

With this circuit construction, reference voltages $V_{ref}^+$ and $V_{ref}^-$ can be so set as to satisfy the following relation. That is, reference voltage $V_{ref}^+ \geq$ (output voltage V1 of constant voltage circuit 133—forward voltage drop of diode D), and reference voltage $V_{ref}^- \leq$ —(output voltage V1 of constant voltage circuit 133—forward voltage drop of diode D).

Under this condition, it is prevented that the conversion gain of A/D converter 21 becomes too large to cause erroneous operation when the sum of the two detection outputs approaches zero while no beam spot is being projected on position detector 311.

What is claimed is:

1. An apparatus for processing signals from a detector, the detector having at least first and second areas for generating electrical signals upon receiving a physical quantity, comprising:

first operation means for deriving out the sum of the electrical signals from at least the first and second areas of the detector to generate a first operation signal, the first operation signal having a predetermined amplitude;

second operation means for deriving out the difference between the electrical signals from at least the first and second areas of the detector to generate a second operation signal; and converting means for converting the second operation signal generated by the second operation means into digital data in accordance with a conversion gain determined by the amplitude of the first operation signal generated by the first operation means.

2. An apparatus according to claim 1, wherein the converting means includes an A/D converter for converting the second operation signal into the digital data.

3. An apparatus according to claim 1, wherein the detector includes a pair of photo-detectors for generating two electrical signals.

4. An apparatus for detecting a light beam from an optical memory, comprising:

means for focusing the light beam onto the optical memory;

means for detecting the light beam from the optical memory, the detecting means having a first detecting portion for generating a first signal corresponding to the amount of the light beam detected thereby and a second detecting portion for generating a second signal corresponding to the amount of the light beam detected thereby;

means for adding the first signal and the second signal so as to generate a first operation signal, the first operation signal having a predetermined amplitude;

means for subtracting the second signal from the first signal so as to generate a second operation signal;

means for converting the second operation signal generated by the subtracting means into the digital data in accordance with a conversion gain determined by the amplitude of the first operation signal generated by the adding means; and means responsive to the digital data for adjusting the location of the focusing means with respect to the optical memory.

5. An apparatus according to claim 4, wherein the converting means includes an A/D converter for converting the second operation signal into the digital data.

6. An apparatus according to claim 4, wherein the focusing means includes an objective lens for focusing the light beam onto the optical memory.

7. A method of detecting a light beam from an optical memory, comprising the steps of:

focusing the light beam onto the optical memory by an optical element;

detecting the light beam from the optical memory by a detector, the detector having a first detecting portion for generating a first signal corresponding to the amount of the light beam detected thereby and a second detecting portion for generating a second signal corresponding to the amount of the light beam detected thereby;

adding the first signal and the second signal by an adder so as to generate a first operation signal, the first operation signal having a predetermined amplitude;

subtracting the second signal from the first signal by a subtracter so as to generate a second operation signal;

converting the second operation signal generated by the subtracter into the digital data by a converter in accordance with a conversion gain determined by the amplitude of the first operation signal generated by the adder; and adjusting the location of the optical element with respect to the optical memory by an adjuster in accordance with the digital data.

8. A method according to claim 7, wherein the converter includes an A/D converter for converting the second operation signal into the digital data.

9. A method according to claim 7, wherein the detector includes a pair of photodetectors for generating the first signal and the second signal.

* * * * *